Jan. 19, 1965     D. I. BOHN     3,166,701
A.-C. HOIST CONTROL SYSTEM
Filed July 25, 1962     3 Sheets-Sheet 1
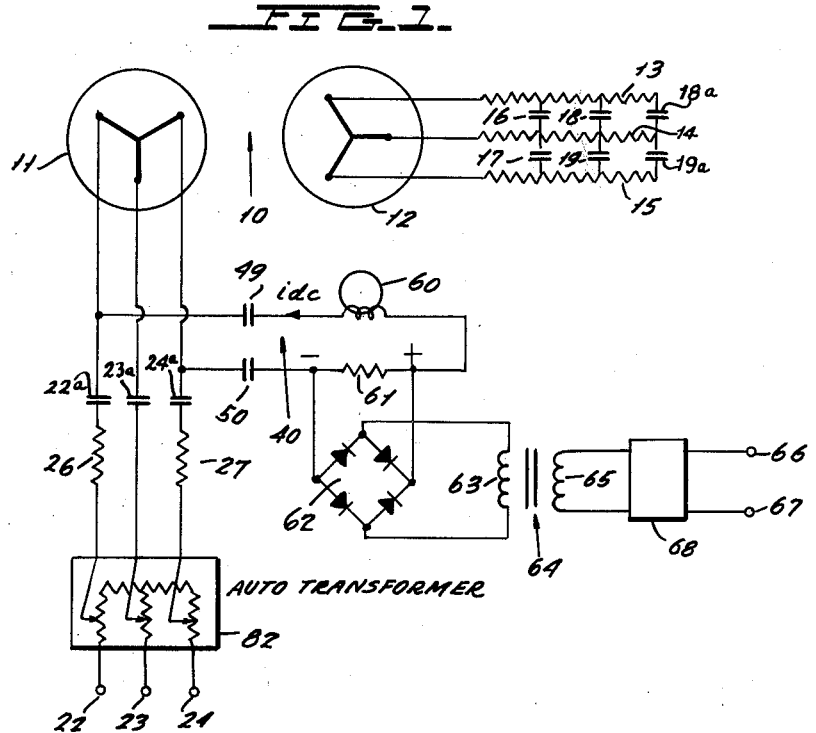
FIG. 1.
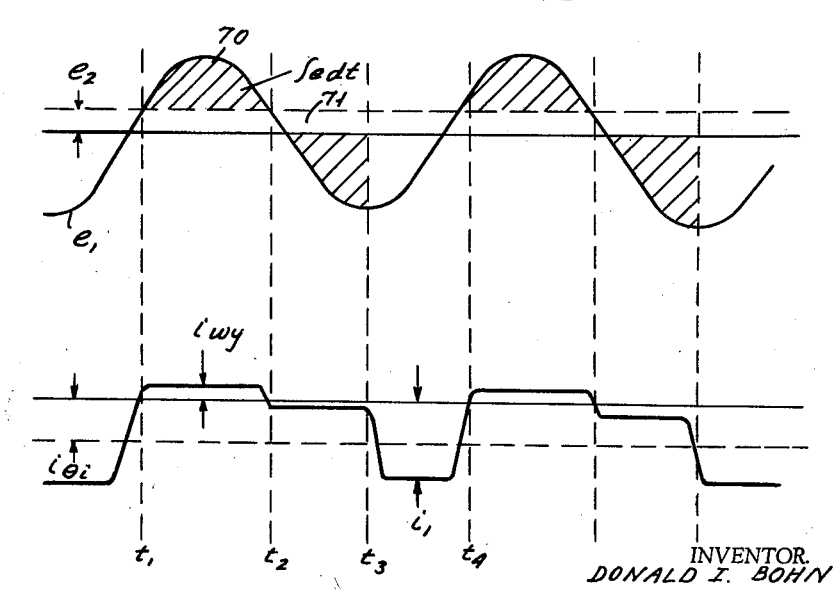
FIG. 3a.
FIG. 3b.
INVENTOR.
DONALD I. BOHN
BY
OSTROLENK, FABER, GERB & SOFFEN
ATTORNEYS

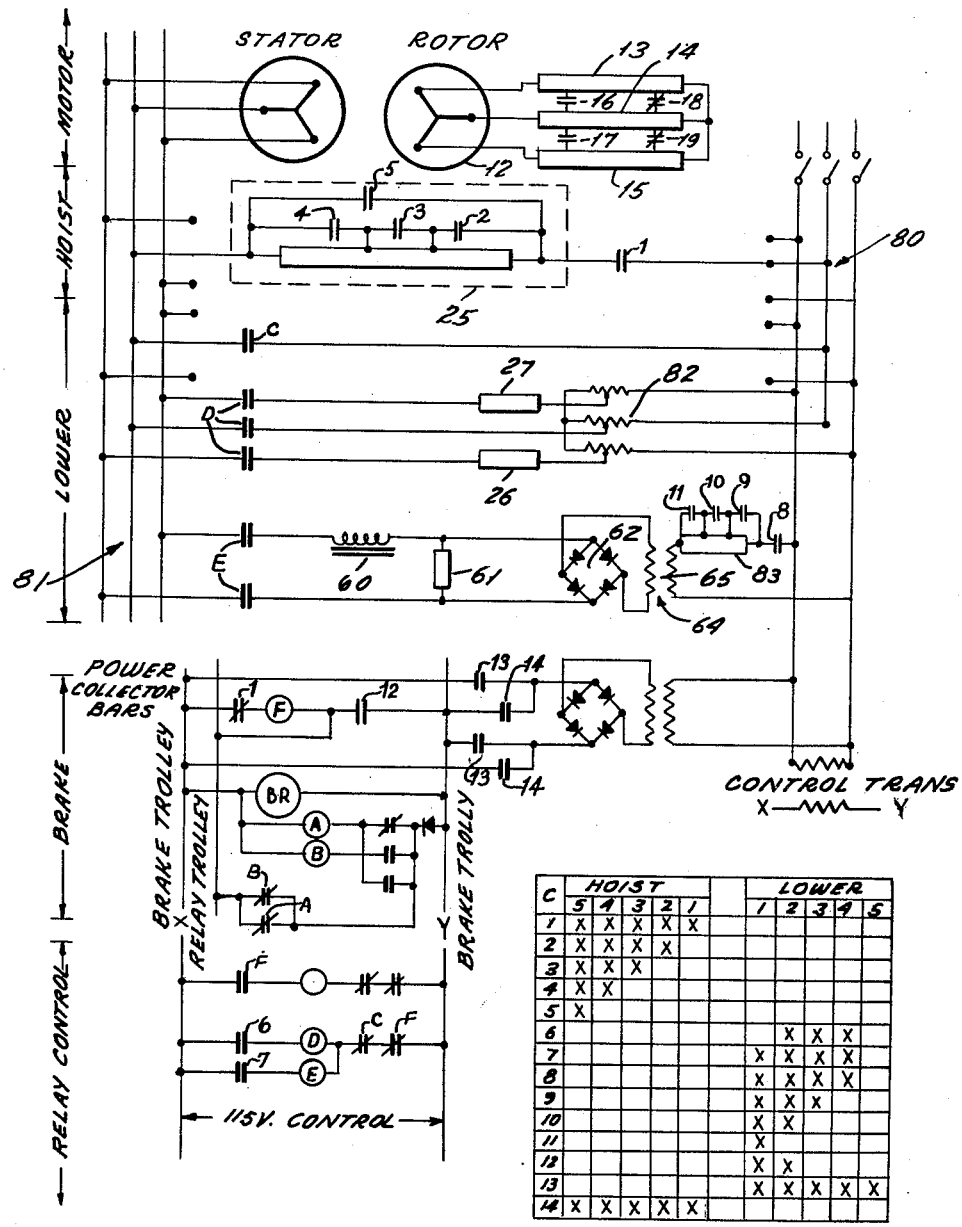

United States Patent Office 3,166,701
Patented Jan. 19, 1965

3,166,701
A.-C. HOIST CONTROL SYSTEM
Donald I. Bohn, Asheville, N.C., assignor to I-T-E Circuit Breaker Company, Philadelphia, Pa., a corporation of Pennsylvania
Filed July 25, 1962, Ser. No. 212,335
7 Claims. (Cl. 318—212)

My invention relates to a control system for A.-C. motors used in hoist systems, and more specifically relates to a novel control structure which will cause an A.-C. motor to perform in the same manner as a D.-C. motor.

The invention more specifically contemplates the use of a standard A.-C. induction motor which is provided with a 39% slip resistor for operation during hoisting, whereby the hoisting characteristics of a D.-C. motor can be imitated. During lowering operation, and in accordance with the invention, a D.-C. current is superimposed upon the standard A.-C. excitation of the motor and driven in the lowering mode. It is to be emphasized that in this lowering mode of operation at selected control points, there will be three torques applied to the motor. The first is a positive downward driving torque due to the three-phase excitation of the motor; the second is the downward torque caused by the load; and the third is a braking torque caused by the D.-C. excitation. By applying these three torques in a controlled manner, it will be shown that all of the characteristics of a D.-C. motor in a lowering mode of operation can be substantially reproduced.

It has been the accepted practice for many years in the field of so-called "working cranes" such as the hoist used in industrial plants and the like to install an extensive and expensive D.-C. network for powering D.-C. motors used in the cranes. That is to say, the inherent characteristics of a D.-C. series motor make it particularly applicable for use in hoists or cranes where a dynamic braking circuit is used for lowering.

The art is replete with examples of attempts to replace the commonly used D.-C. motor by the more desirable A.-C. motor which is inherently less expensive, requires less maintenance, and can use the normal A.-C. electrification of a plant. Notwithstanding the extensive work that has been done in this field, a wholly acceptable system which is sufficiently economical and reliable has not yet found extensive public acceptance. Many attempts to provide A.-C. motors in hoisting applications include the application of counter torques to the motor when it is in its lowering mode of operation. That is to say, the motor is so energized that it attempts to drive upwardly during the lowering mode. A cursory examination of systems using this concept prove that the equipment required is extensive and the results are questionable in providing the desired smooth, constant control of the system by an operator.

In accordance with the present invention, and during the lowering mode of operation, D.-C. braking along with continued A.-C. driving in the down direction are combined along with the load on the hook to provide the required smooth control. It is to be specifically noted that where the art turns to D.-C. braking systems, the D.-C. braking is applied either in the absence of A.-C. control or along with single phasing of the polyphase source.

One of the concepts of the present invention, as distinguished from prior use of D.-C. energization, is that the D.-C. energization occurs simultaneously with three-phase A.-C. excitation. It is to be noted that the D.-C. voltage source for driving the D.-C. braking current is necessarily a low voltage source, since the D.-C. resistance of the motor windings receiving the D.-C. current is low. Thus, the invention further contemplates novel methods for injecting D.-C. current into a relatively high A.-C. voltage energized system.

To better understand the overall operation of the system of the novel invention and the manner in which the system will imitate the operation of a D.-C. motor, the desirable D.-C. motor characteristics in hoist applications may be summarized for the hoisting operation as follows:

(1) The last point hoisting at rated load will be at rated speed.
(2) The last point hoisting with more than rated load will be at less than rated speed.
(3) Last point hoisting with less than the rated load will be at greater than rated speed.
(4) With an empty hook, hoisting takes place at 150% or more of rated speed.

The items 1 through 4 above are achieved in accordance with the invention by the use of an approximately 39% slip resistor in the rotor windings which will alter the effective rating of the motor. It is to be emphasized that the rating of the motor with the connection of the 39% resistor represents the rated hoisting speed at full load. The desirable D.-C. characteristics achieved by D.-C. motors during lowering are as follows:

(5) First point lowering of the rated load is at less than 40% so that there may be accurate spotting of the load by the operator.
(6) Succeeding lowering points are carried out at respectively faster lowering speeds.
(7) On all but the first lowering point, an empty hook will be driven down at a speed which depends upon the controller position.
(8) On last lowering point, an empty hook will be lowered at 150% or more rated lowering speed.
(9) There is complete control of the lowering speed with any load within the lowering speed limits.

The lowering conditions 5 through 9 which are typical of a D.-C. system, are achieved in accordance with the present invention through the novel combination of the application of D.-C. current to the stator windings simultaneously with the application of the three-phase excitation of the motor for lowering operation.

Condition 5 is achieved by disconnecting the A.-C. drive, since the weight of the load will provide the downward motion. The D.-C. system supplies its full D.-C. current to the motor to operate in the manner of an eddy current brake.

For all other lowering points, both the A.-C. excitation and D.-C. excitation will be simultaneously applied. Thus, for conditions 6 and 7, appropriate combination of positive downward torque from the three-phase motor excitation along with appropriately controlled eddy current braking action from the D.-C. brake, in combination with the weight of the load, provide the various control required.

For condition 8, the D.-C. braking action could be completely disconnected so that only positive A.-C. drive is available.

Accordingly, a primary object of this invention is to provide a novel A.-C. motor hoist control system.

Another object of this invention is to provide a novel hoist control system for A.-C. motors which permits operation in the same manner as with a D.-C. motor.

A further object of this invention is to provide a combined D.-C. excitation and three-phase A.-C. excitation for an A.-C. motor used in a working crane under lowering conditions.

Another object of this invention is to provide a novel hoist control system for A.-C. motors which does not require a specially designed motor.

A further object of this invention is to imitate the characteristics of a D.-C. dynamic braking hoist control system with an A.-C. motor.

Another object of this invention is to provide a novel A.-C. motor hoist system which permits the lowering mode of operation to be used in a manner similar to systems using D.-C. motors.

These and other objects of my novel invention will become apparent from the following description when taken in connection with the drawings, in which:

FIGURE 1 shows a schematic diagram which illustrates the principle of operation of the novel hoist control system of the invention during the lowering mode.

FIGURE 3a illustrates voltage as a function of time for the D.-C. current injecting circuit of FIGURE 1.

FIGURE 3b illustrates current as a function of time for the D.-C. current injecting circuit of FIGURE 1.

FIGURE 4 is a circuit diagram along with a switching diagram to illustrate a complete embodiment of the invention utilizing the D.-C. current injecting circuit arrangement shown in FIGURE 1.

Figure 2:
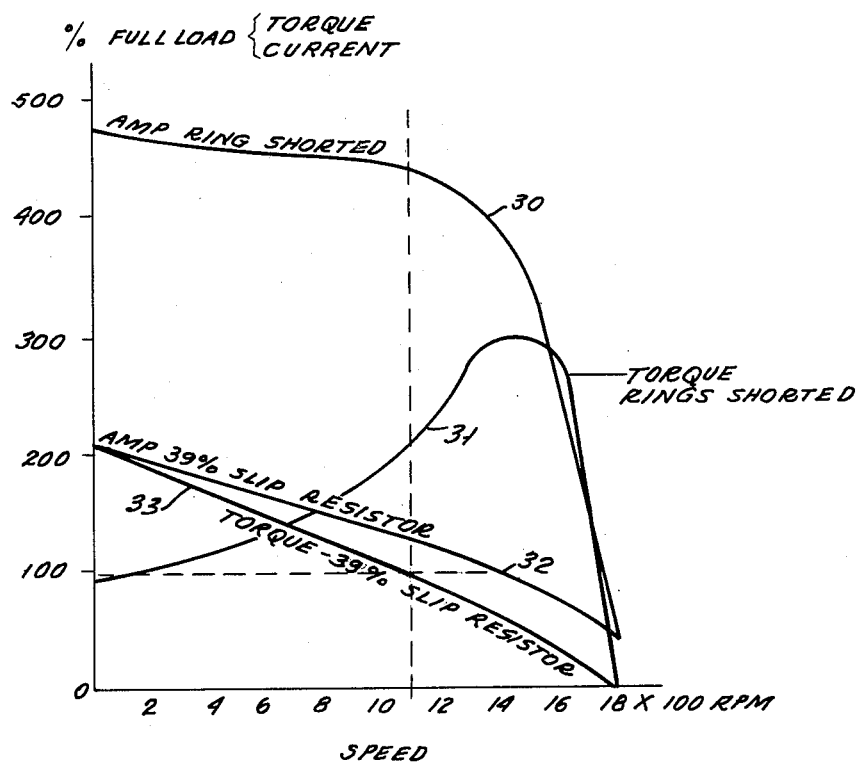
FIGURE 2 shows the stator current-torque characteristics of the motor system of FIGURE 1 under hoisting conditions.

Referring first to FIGURE 1, I have illustrated therein a standard A.-C. slip ring motor 10 having a stator winding 11 and rotor winding 12. The rotor winding 12 is provided with slip resistors 13, 14 and 15 which are associated with pairs of contactors 16–17, 18–19 and 18a, 19a. For the lowering mode, the stator winding 11 is then connected through contactors 22a, 23a and 24a to a source of three-phase A.-C. voltage at terminals 22, 23 and 24 which are connected to an autotransformer 82 supplying about ½ of line voltage. It will be noted that two of the stator leads have resistors 26 and 27 therein which are of such a value as to give a stalled torque of about 35% of rated torque to drive down an empty or lightly loaded hook at any desired speed.

The motor 10 may be a standard four-pole slip ring motor. For example, if a 50 horsepower motor is required to give 100% hoisting speed with full load, the motor as purchased would be rated as follows:

100 horsepower at 1750 r.p.m.;
125 ampere stator current;
440 volts stator voltage, three-phase, 60 cycles;
302 foot pounds of torque for a 55° centigrade
    temperature rise.

In accordance with the first aspect of the invention, the resistors 13, 14 and 15, when contactors 16 and 17 are open, will provide a 39% fixed slip across rotor 12. Thus, the rotor will be rated as follows:

50 horsepower, 1100 r.p.m.;
Stator current, 102 amperes;
440 volts, three-phase, 60 cycles;
239 foot pounds of torque at 40° centigrade temperature
    rise.

It is to be emphasized that the rated hoisting speed with full load now becomes 1100 r.p.m. rather than the 1750 r.p.m. of the motor prior to the connection of the 39% slip resistor.

The characteristics of the motor for hoisting operation under the controlling influence of regulator 25 are illustrated in FIGURE 2. Referring to FIGURE 2, I have shown both torque and current characteristics for the motor as a function of motor speed in r.p.m. Curve 30 shows the stator current with shorted rings, as a function of r.p.m. The curve 31 illustrates the torque of the motor under this shorted condition. Curve 32 illustrates the stator current when the full 39% slip resistor is connected in the system, while curve 33 illustrates the torque for this condition. During hoisting only the 39% slip resistor is used since this gives the four desired D.-C. motor characteristics listed above for hoisting operation.

From the foregoing, it will be recognized that a wide range of torque characteristics can be obtained during hoisting by merely varying the applied stator voltage in any desired manner. This provides a performance substantially identical to that found with series D.-C. motors.

The problem still remains to imitate the characteristics of the series D.-C. motor with dynamic braking during lowering operation. This specific problem that has not found a truly acceptable solution in the art, notwithstanding tremendous efforts which have been expended by motor manufacturers and inventors in this field.

In accordance with the invention, a novel D.-C. current injecting circuit is provided which can inject D.-C. current into the stator winding simultaneously with the application of the reduced three-phase A.-C. power to drive the motor downwardly and in further cooperation with whatever torque may be applied to the motor by the load on the hook.

The novel D.-C. injection circuit is specifically shown in FIGURE 1 as circuit 40 which cooperates with resistors 26 and 27 and includes the closed series connection of a saturable reactor 60 and resistor 61. The saturable reactor 60 can be of any desired type having a low magnetizing current and relatively square-shaped hysteresis loop.

The resistor 61 is connected in parallel with rectifier bridge 62 so that, for example, the right-hand end of resistor 61 is held positive with respect to its left-hand end. The rectifier 62 is then connected to an input A.-C. source of voltage formed by secondary winding 63 of transformer 64. The primary winding 65 of transformer 64 is then connected to the A.-C. terminals 66 and 67 of an appropriate single phase source of A.-C. voltage through an appropriate regulator means 68. Contactors 49 and 50 are then provided to connect the injection system into stator 11 during lowering conditions and to disconnect it during hoisting conditions.

The novel circuit 40 of FIGURE 1 is such that the full line-to-line voltage of terminals 22, 23 and 24 is not applied across rectifier 62. The operation of circuit 40 of FIGURE 1 can be best understood by reference to FIGURES 3a and 3b.

Assuming for the moment that line 22 is positive with respect to line 24, the voltages around circuit 40 will be the sinusoidal voltage $E_1$ of FIGURE 3a which is the voltage between lines 22 and 24 and the constant voltage $E_2$ which is the voltage drop across resistor 61 and the output voltage of rectifier 62. These two voltages $E_1$ and $E_2$ oppose one another when line 22 is positive so that the volt seconds applied to saturable reactor 60 are the volt seconds $\int(E_1-E_2)dt$ shown in cross-hatched area 70 of FIGURE 3a. The reactor 60 is designed so that its volt second rating is at least equal to the area 70 when the voltage $E_1$ is at a maximum.

From this it will be seen that for substantially all of the half-cycle in which line 22 is positive with respect to line 24, only the magnetizing current of reactor 60, which is small, will flow through resistor 61 shown as the current $i_{mag}$ in FIGURE 3b from time $t_1$ to time $t_2$. Thus, the voltage drop across resistor 61 due to this magnetizing current is relatively small and can be easily withstood by the rectifiers of bridge 62 which may have a low reverse voltage rating. During the half-cycle in which line 24 becomes positive with respect to line 22, however, both this line voltage as well as the D.-C. voltage from bridge 62 are connected to reactor 60 as illustrated by area 71 in FIGURE 3a. The reactor 60 which has been designed to have a volt second rating substantially of the order of area 70 will, therefore, saturate at a time $t_3$ prior to the end of the negative half-cycle of the A.-C. voltage of terminals 22 and 24. Thus, the reactor saturates at time $t_3$ (area 70 being equal to area 71) so that, from time $t_3$ until time $t_4$ a D.-C. current can flow from circuit 40 into stator winding 11 which is impeded only by the low D.-C. impedance of the stator windings.

During the time $t_3$ to time $t_4$ of FIGURE 3b, a current having a peak value $i_1$ will flow from circuit 40 and into stator 11 and the A.-C. source, the division of currents being determined by the relative impedances of the stator and the source along with appropriate magnitudes of resistors 26 and 27. Thus, an average current $i_{D.-C.}$ will pass into both the stator and A.-C. source with appropriate division taking place so that the desired D.-C. current passes into stator winding 11. Clearly, the magnitude of this injected D.-C. current is appropriately controlled by the control of regulating means 68.

Where rated load is on the hook and a load is to be lowered, there is a sufficient downward torque provided by the load alone to provide appropriate lowering. Under this condition, the motor A.-C. current can be completely disconnected with the D.-C. injecting system being adjusted through regulator 68 to apply a maximum control D.-C. current. Under this condition, the D.-C. current flowing from circuit 40 and into stator 11 (with resistors 26 and 27 preventing a short circuiting of the stator through the A.-C. source) will provide a stationary magnetic field in the stator which will operate in the manner of an eddy current brake so as to brake the downward motion of the load. Speed control of the downward motion of the load can, of course, be obtained by appropriate control of the magnitude of D.-C. current flowing into stator 11 by control of regulator 68.

For all of the other lowering points on the controller, the injected D.-C. current will cooperate with continuous application of reduced A.-C. voltage to stator 11 for downward driving of motor 10. Thus, where an intermediate load is on the hook, and it is desired to move this load quickly to a downward position until accurate load spotting can be obtained, a downward A.-C. drive is provided by the cooperation of A.-C. voltage applied to stator 11 which is appropriately controlled by regulator 25 and the downward torque caused by the load. These two downward forces are impeded in a controlled manner by the simultaneous injection of a controlled amount of D.-C. current through the appropriate control of source 68.

Accordingly, the operator has at his command the ability to off-set the amount of positive downward torque by appropriate control of the amount of injected D.-C. current, whereby a wide range of control is afforded the operator. Of course, this control range will be predetermined for the operator in the controller which he operates so that he makes no conscious combination of D.-C. injected current and applied A.-C. downward driving voltage. Nevertheless, the ability to provide various combinations of downward driving A.-C. voltage and braking D.-C. current is afforded in the controller, whereby continuous and smooth control of any load at substantially any speed is provided by the invention.

It is to be particularly noted that since downward driving torque can be afforded by A.-C. excitation of the motor, where an empty hook is encountered, the empty hook can be positively driven downwardly with the complete removal of D.-C. injected current so that the hook can be moved downwardly, for example, at 150% rated speed, even though there is no load torque to assist the downward driving action.

In a typical embodiment of the invention, and where the motor 10 is of the type described above for FIGURE 1, and where the lowering A.-C. voltage to be applied to terminals 22, 23 and 24 is line voltage, the resistors 26 and 27 can have a value to give a stalled motor torque of about 35% of rated torque. The resistor 61 can have a value such that the magnetizing current of reactor 60, receiving half voltage from auto-transformer 82, will provide a voltage drop across resistor 61 not exceeding 15 volts or so. The maximum output voltage of bridge 62 can be of the order of 25 volts for an average 440 volt motor. Such a system will result in a maximum average braking current of the order of twice rated stator amperes in stator winding 11 during the negative half-cycles with a considerably lower current determined by the magnetizing current of reactor 60 during the positive half-cycles which could be of a negligible value.

FIGURE 4 shows a complete schematic diagram of the hoist control system using the specific D.-C. current injection described in FIGURE 1. While the diagram is believed to be self-explanatory, the following should be observed:

The single hoist resistor illustrated in the hoist section of the diagram having contactors 1 through 5 associated therewith is provided, one for each phase as schematically indicated, and is connected from the input source of three-phase 60 cycle power 80 to the power collector bars 81. It will be noted that the power collector bars and trolleys which would cooperate therewith are only three in number so that the power collection system is considerably simplified as contrasted to those systems which would require six trolley conductors.

The slip resistors connected to rotor 12 further provide 10% to 20% slip with contactors 16 and 17 closed, a 39% slip with contactors 16 and 17 open, and 18 and 19 closed and 70% slip when all contactors are open. Regenerative braking can be achieved with the 10% to 20% slip resistor with contactors 16 and 17 closed. During lowering conditions, and as indicated above, it is desired that the A.-C. voltage applied to the stator 11 be reduced from 440 volts to approximately 110 volts. This is accomplished as shown in FIGURE 4 through the contactor D which cooperates with the three-phase autotransformer 82 which steps the voltage of power source 80 down to 110 volts when applied to the power collector bars 81.

Moreover, during the lowering mode of operation and closing of contactors E, the circuit described in FIGURE 1 which includes saturable reactor 60, resistor 61, rectifier 62 and transformer 64 are connected into circuit relation with the control system. The specific mode of control for D.-C. current injection is accomplished by the tapped resistor 83 which has the contactors 8 through 11 associated therewith for controlling the voltage applied to primary winding 65 of transformer 64.

It will be further noted that FIGURE 4 adds a positive brake control system wherein a physical brake can be applied to the rotor at certain control points. The relay control system which is shown in the lower portion of the schematic diagram of FIGURE 4 is self-explanatory by reference to the controller diagram wherein contactors and corresponding solenoid are given similar numerals or letters corresponding to the controller diagram.

Although I have described preferred embodiments of my novel invention, many variations and modifications will now be apparent to those skilled in the art, and I prefer, therefore, to be limited not by the specific disclosure herein but only by the appended claims.

The embodiments of the invention in which an exclusive privilege or property is claimed are defined as follows:

1. A hoist control system for a polyphase A.-C. hoist motor; said hoist control system including a source of polyphase A.-C. voltage connectable to said motor, control means for reversing the phase sequence of said polyphase A.-C. voltage for reversing the mode of operation of said system from hoisting to lowering, and means for injecting D.-C. current into said stator winding while driving said motor in said lowering mode of operation from said polyphase A.-C. voltage source; a rectifier means having an input and an output; an auxiliary A.-C. voltage source connected to said input of said rectifier means; said means for injecting said D.-C. current including the connection of said output of said rectifier means across two lines of said polyphase A.-C. voltage source.

2. A hoist control system for a polyphase A.-C. hoist motor; said hoist control system including a source of polyphase A.-C. voltage connectable to said motor, control means for reversing the phase sequence of said polyphase A.-C. voltage for reversing the mode of operation of said system from hoisting to lowering, and means for injecting D.-C. current into said stator winding while driving said motor in said lowering mode of operation from said polyphase A.-C. voltage source; said means for injecting said D.-C. current including the connection of rectifier means and series connected auxiliary A.-C. voltage source means across two lines of said polyphase A.-C. voltage source; said two lines having respective series connected resistor means therein between the point of connection of said injecting means and said source of polyphase A.-C. voltage.

3. A hoist control system for a polyphase A.-C. hoist motor; said hoist control system including a source of polyphase A.-C. voltage connectable to said motor, control means for reversing the phase sequence of said polyphase A.-C. voltage for reversing the mode of operation of said system from hoisting to lowering, and means for injecting D.-C. current into said stator winding while driving said motor in said lowering mode of operation from said polyphase A.-C. voltage source; said means for injecting said D.-C. current including the connection of rectifier means and series connected auxiliary A.-C. voltage source means across two lines of said polyphase A.-C. voltage source; said means for injecting said D.-C. current including the connection of a saturable reactor and resistor in series therewith across two lines of said polyphase A.-C. source; said resistor having a D.-C. voltage source connected thereacross.

4. A hoist control system for a polyphase A.-C. hoist motor; said hoist control system including a source of polyphase A.-C. voltage connectable to said motor, control means for reversing the phase sequence of said polyphase A.-C. voltage for reversing the mode of operation of said system from hoisting to lowering, and means for injecting D.-C. current into said stator winding while driving said motor in said lowering mode of operation from said polyphase A.-C. voltage source; said means for injecting said D.-C. current including the connection of rectifier means and series connected auxiliary A.-C. voltage source means across two lines of said polyphase A.-C. voltage source; said means for injecting said D.-C. current including the connection of a saturable reactor and resistor in series therewith across two lines of said polyphase A.-C. source; said resistor having a D.-C. voltage source connected thereacross; said saturable reactor preventing full line-to-line reverse voltage from appearing across said D.-C. voltage source.

5. A hoist control system for a polyphase A.-C. hoist motor; said hoist control system including a source of polyphase A.-C. voltage connectable to said motor, control means for reversing the phase sequence of said polyphase A.-C. voltage for reversing the mode of operation of said system from hoisting to lowering, and means for injecting D.-C. current into said stator winding while driving said motor in said lowering mode of operation from said polyphase A.-C. voltage source; said means for injecting said D.-C. current including the connection of rectifier means and series connected auxiliary A.-C. voltage source means across two lines of said polyphase A.-C. voltage source; said means for injecting said D.-C. current including the connection of a saturable reactor and resistor in series therewith across two lines of said polyphase A.-C. source; said resistor having a D.-C. voltage source connected thereacross; said saturable reactor preventing full line-to-line reverse voltage from appearing across said D.-C. voltage source; said two lines having respective series connected resistor means therein between the point of connection of said injecting means and said source of polyphase A.-C. voltage.

6. A D.-C. current injecting circuit for a polyphase A.-C. motor for injecting D.-C. current at relatively low D.-C. voltage into said motor while said motor is connected to a polyphase A.-C. voltage source; said D.-C. current injecting circuit including a saturable reactor connected in circuit relation with rectifier means; circuit connection means for connecting said rectifier means across two input lines of said polyphase A.-C. motor; said saturable reactor being operable to prevent application of excessive reverse voltage from said two input lines to said rectifier.

7. A D.-C. current injecting circuit for a polyphase A.-C. motor for injecting D.-C. current at relatively low D.-C. voltage into said motor while said motor is connected to a polyphase A.-C. voltage source; said D.-C. current injecting circuit including a saturable reactor connected in circuit relation with rectifier means; circuit connection means for connecting said rectifier means across two input lines of said polyphase A.-C. motor; said saturable reactor being operable to prevent application of excessive reverse voltage from said two input lines to said rectifier; a source of A.-C. voltage and a resistor means connected in parallel with said rectifier means; said resistor means connected in series with said saturable reactor.

References Cited in the file of this patent
UNITED STATES PATENTS

| | | |
|---|---|---|
| 2,774,023 | Griffes | Dec. 11, 1956 |
| 2,996,648 | Bohn | Aug. 15, 1961 |